Patented Aug. 23, 1938

2,128,100

UNITED STATES PATENT OFFICE 2,128,100

PREPARATION OF 4,4'-DIALKOXY DIPHENYLAMINES

Arthur M. Neal, Wilmington, Del., assignor to E. I. du Pont de Nemours & Company, Wilmington, Del., a corporation of Delaware No Drawing. Application June 5, 1936, Serial No. 83,807

9 Claims. (Cl. 260—571)

This invention relates to new compositions of matter and methods of making them, and more particularly to a new method of preparing 4,4'-dimethoxy diphenylamine and a composition consisting of a mixture of 4,4'-dimethoxy diphenylamine and N-methyl-4,4'-dimethoxy diphenylamine.

Among the several methods described in the literature for the production of 4,4'-dimethoxy diphenylamine, the most commonly followed heretofore is that described in Ber. 41, 3493 (1908) by the interaction of iodoanisole with acetyl-p-anisidine using copper bronze as a catalyst and sodium carbonate as an acid acceptor. By this process N-acetyl-4,4'-dimethoxy diphenylamine is first formed and the free base subsequently obtained by hydrolysis of the acetyl group. Myer and his co-workers, Ber. 52, 1478 (1919) and 54, 332 (1921), have described a rather complicated method from anisole involving the quinoid salts of di-p-anisyl-hydroxylamine-N-oxide. Neither method is suitable for commercial exploitation.

This invention has as an object to provide a new method of preparing 4,4'-dialkoxy diphenylamines and particularly 4,4'-dimethoxy diphenylamine. A further object is to provide certain new compositions of matter consisting of mixtures of 4,4'-dimethoxy diphenylamine and N-methyl-dimethoxy diphenylamine. Other objects will appear hereinafter.

These objects are accomplished by the following invention which comprises alkylation of p-(4-alkoxy-anilino)-phenolates, e. g., a p-(4-methoxy-anilino)-phenolate, with an alkyl ester, preferably a methyl ester of an inorganic acid, for instance, dimethyl sulfate or methyl chloride.

The method of carrying out this invention is described more fully in the following examples in which the quantities are stated in parts by weight.

Example I

Two hundred fifteen (215) parts of p-(OH)-p'-(OCH$_3$) diphenylamine, 44 parts of NaOH, 430 parts of water and 15 parts of sodium hydrosulfite are charged into an iron kettle and heated to 70° C. with agitation. The charge is held at 70° C. for one-half hour to insure complete solution. It is then cooled to 30°–35° C., and 190 parts of dimethyl sulfate is added slowly. Approximately two hours are required for the addition. During the addition of the dimethyl sulfate, the charge is cooled sufficiently to keep the temperature between 30°–35° C. During the addition of the dimethyl sulfate, the charge is kept alkaline to Clayton yellow paper and, if necessary, the addition of dimethyl sulfate is interrupted to allow the addition of additional sodium hydroxide solution in order to maintain this alkalinity. Dimethoxy diphenylamine is insoluble in alkaline solution and preciptates from the solution as it is formed. Completion of methylation is shown by spotting on filter paper, the absence of color in the outspread on oxidation is indicative of the completion of the reaction. Some methylation also takes place on the nitrogen atom, forming N-methyl-4,4'-dimethoxy diphenylamine as a by-product. Part of the dimethyl sulfate is also hydrolyzed by the caustic solution so that somewhat more than the theoretical amount of dimethyl sulfate is used.

After methylation the reaction mass is drowned in water and the residue consisting of 4,4'-dimethoxy diphenylamine together with some N-methyl-4,4'-dimethoxy diphenylamine is filtered off and washed alkaline free. In this way 215 parts of crude dimethoxy diphenylamine are obtained. The product has a melting point of 87°–93° C. It may be purified by vacuum distillation and by recrystallization, but neither of these procedures will remove all of the N-methyl-4,4'-dimethoxy diphenylamine. The crude product as obtained directly from the methylation, however, is suitable for use as an antioxidant in rubber.

Example II

An alternate method of carrying out the methylation is outlined below.

Two hundred fifteen (215) parts of p-(OH)-p'-(OCH$_3$) diphenylamine, 44 parts of NaOH, 430 parts of water and 15 parts of sodium hydrosulfite are charged into an iron kettle and heated to 95° C. with vigorous stirring. Then 190 parts of dimethylsulfate are added. During the addition of dimethyl sulfate, an alkalinity to Clayton yellow is maintained by the addition of additional NaOH solution, if necessary. The product obtained by this method, however, contains more of the N-methyl-dimethoxy diphenylamine than when the methylation is carried out according to Example I.

Example III

Two hundred fifteen (215) parts of p-(OH)-p'-(OCH$_3$) diphenylamine are dissolved in 400 parts of ethyl alcohol in an autoclave, and 44 parts of solid NaOH are added. The autoclave is closed and heated to 95° C. with vigorous stirring.

Methyl chloride is then passed into the autoclave to give a pressure of 50 pounds per square inch and this pressure is maintained until 70 parts of methyl chloride have been added. The temperature is kept at 90°–95° C. during the addition and the heating is continued at 95° C. for two hours after the pressure has dropped to 20 pounds which shows that the methylation is nearly complete.

The alcohol is then distilled off and the product washed by stirring with boiling water.

If this wash is not alkaline to Clayton yellow paper, sufficient caustic is added to produce this alkalinity. The product is then filtered, washed alkaline free with water and dried.

In place of the dimethyl sulfate and methyl chloride used in the examples, other alkylating agents such as methyl bromide, methyl iodide or p-toluene sulfon methyl ester may be used. It is also possible to replace the ethyl alcohol used in Example III with methyl alcohol. Other inert solvents may be used.

While the process is especially desirable for making 4,4'-dimethoxy diphenylamine, it may also be used generally for making 4,4'-dialkoxy diphenylamines, including the diethoxy, dipropoxy, and higher homologues. In making these latter compounds, the corresponding higher alkylating agents are used with the p-(4-alkoxy-anilino)-phenolates in which the alkoxy group is of a higher order than methoxy, e. g., ethoxy and higher homologues. The process may also be used in preparing unsymmetrical dialkoxy diphenylamines, e. g., 4-ethoxy-4'-methoxy diphenylamine, and similar compounds, by the reaction of a compound of the formula

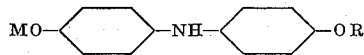

where M represents a metal (e. g., sodium, potassium, barium, calcium, strontium), and R is alkyl, with an alkylating agent of the formula R'X, in which X represents the negative radical of an acid, and R' represents alkyl but is different from R.

An alkali, as for example, caustic soda, caustic potash and/or alkaline earth hydroxides, e. g., barium or strontium hydroxides, is preferably employed in preparing the phenolates.

A reducing agent such as sodium hydrosulfite may be used as a precautionary measure to prevent oxidation.

Superatmospheric temperatures and/or pressures may be used in the reaction. In the methylation reaction with dimethyl sulfate as the methylating agent, the low temperature process of Example I gives better results than the higher temperature process of Example II.

When the term "lower" precedes the words "alkyl" and "alkoxy" in the claims, it will be understood that such alkyl or alkoxy radical contains not more than seven carbon atoms.

The products are useful in preventing deterioration of rubber and may be used as intermediates in the preparation of dyes.

The process is advantageous in that it proceeds simply and smoothly with relatively high yields of products which are directly useful for the purposes just mentioned.

As many apparently widely different embodiments of this invention may be made without departing from the spirit and scope thereof, it is to be understood that I do not limit myself to the specific embodiments thereof except as defined in the appended claims.

I claim:

1. The process which comprises reacting at about 30° to about 95° C. a lower alkyl ester of an inorganic acid with a p-(4-alkoxy-anilino)-phenolate in which the alkoxy group is a lower alkoxy group in the presence of an inert solvent.

2. The process which comprises reacting at about 30° to about 95° C. a compound having the following formula

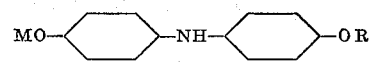

where M represents a metal selected from the alkali and alkaline earth groups, and R represents lower alkyl, with a compound of the formula R'X in which X represents the negative radical of an inorganic acid, and R' represents lower alkyl but is different from R, the reaction taking place in an inert solvent.

3. The process which comprises reacting at about 30° to about 95° C. a lower alkyl ester of an inorganic acid with a 4-hydroxy-4'-alkoxy diphenylamine in which the alkoxy group is a lower alkoxy group in an inert solvent and in the presence of sufficient alkali to maintain the reaction mixture alkaline to Clayton yellow paper.

4. The process which comprises reacting at about 30° to about 95° C. p-(4-methoxy-anilino)-phenolate with a methyl ester of an inorganic acid in an inert solvent.

5. The process which comprises reacting at about 30° to about 95° C. 4-hydroxy-4'-methoxy diphenylamine with a methyl ester of an inorganic acid in an inert solvent and in the presence of sufficient alkali to maintain the reaction mixture alkaline to Clayton yellow paper.

6. The process which comprises reacting 4-hydroxy-4'-methoxy diphenylamine with dimethyl sulfate in the presence of a sufficient amount of an aqueous solution of caustic alkali to maintain the reaction mixture alkaline to Clayton yellow paper at a temperature of about 30° C. to about 35° C.

7. The process which comprises reacting, in water and at about 30° to about 95° C, a lower alkyl ester of an inorganic acid with a p-(4-alkoxy-anilino)-phenolate in which the alkoxy group is a lower alkoxy group.

8. The process which comprises reacting, in water and at about 30° to about 95° C, a lower alkyl ester of an inorganic acid with a 4-hydroxy-4'-alkoxy diphenylamine in which the alkoxy group is a lower alkoxy group in the presence of sufficient alkali to maintain the reaction mixture alkaline to Clayton yellow paper.

9. The process which comprises reacting, at about 30° to about 95° C., a 4-hydroxy-4'-methoxy diphenylamine with a methyl ester of an inorganic acid in an aqueous solution containing sufficient alkali to maintain the reaction mixture alkaline to Clayton yellow paper.

ARTHUR M. NEAL.